United States Patent
Hilken et al.

(10) Patent No.: US 9,221,026 B2
(45) Date of Patent: Dec. 29, 2015

(54) METHOD AND SYSTEM FOR STUCCO CONDITIONING

(75) Inventors: Matthew M. Hilken, Hiawatha, IA (US); David G. Peterson, Jr., Alden, MI (US); Joseph J. Bailey, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 366 days.

(21) Appl. No.: 13/590,074

(22) Filed: Aug. 20, 2012

(65) Prior Publication Data

US 2013/0092055 A1    Apr. 18, 2013

Related U.S. Application Data

(63) Continuation-in-part of application No. 12/390,299, filed on Feb. 20, 2009, now abandoned.

(60) Provisional application No. 61/030,161, filed on Feb. 20, 2008.

(51) Int. Cl.
| | |
|---|---|
| *B01J 6/00* | (2006.01) |
| *B28C 5/46* | (2006.01) |
| *B28B 17/02* | (2006.01) |
| *B28B 19/00* | (2006.01) |
| *B28C 5/38* | (2006.01) |
| *E04F 13/04* | (2006.01) |
| *B28C 5/36* | (2006.01) |

(52) U.S. Cl.
CPC ............. *B01J 6/001* (2013.01); *B28B 17/023* (2013.01); *B28B 19/0092* (2013.01); *B28C 5/36* (2013.01); *B28C 5/383* (2013.01); *B28C 5/468* (2013.01); *E04F 13/04* (2013.01)

(58) Field of Classification Search
CPC ............. B01F 5/18; B01F 5/20; B01F 5/205; B01F 5/225; B01J 6/001; B28B 17/023
USPC .................... 366/6–8, 153.2, 153.3
See application file for complete search history.

(56) References Cited

U.S. PATENT DOCUMENTS

| | | | | |
|---|---|---|---|---|
| 2,017,022 | A * | 10/1935 | Roos ............................ | 106/680 |
| 4,201,595 | A * | 5/1980 | O'Neill ........................ | 106/783 |
| 4,502,901 | A * | 3/1985 | Burkard ........................ | 156/39 |
| 4,533,528 | A * | 8/1985 | Zaskalicky ................... | 423/171 |
| 5,152,605 | A * | 10/1992 | Yamada et al. .............. | 366/148 |

* cited by examiner

*Primary Examiner* — Charles Cooley
*Assistant Examiner* — Marc C Howell
(74) *Attorney, Agent, or Firm* — Ice Miller LLP (57) ABSTRACT

A process and system for manufacturing gypsum wallboard that aerates, conditions, and cools a portion of the stucco used in the manufacturing process. This conditioning of the stucco reduces the amount of water needed to manufacture the gypsum wallboard which in turn reduces the amount of energy and cost needed to manufacture the wallboard. The stucco may also be pretreated with water. This process may be carried out using a conveyor that agitates a moving bed of stucco while the top surface of the bed is subject to a low pressure water spray.

21 Claims, 5 Drawing Sheets

METHOD AND SYSTEM FOR STUCCO CONDITIONING

RELATED APPLICATIONS

This U.S. Utility Patent Application claims priority as a continuation-in-part application to U.S. patent application Ser. No. 12/390,299, which was filed on Feb. 20, 2009, and which in turn claims priority to Provisional Patent Application Ser. No. 61/030,161, which was filed on Feb. 20, 2008.

BACKGROUND OF INVENTION

The subject invention relates generally to methods and apparatuses for calcining gypsum, and in particular to methods and apparatuses for continuously calcining natural gypsum, synthetic gypsum, or combinations of natural and synthetic gypsum. Calcined gypsum, more commonly known as stucco, is useful as a major ingredient of gypsum wallboard and plaster-based products. Stucco has the valuable property of being chemically reactive with water and will "set" rather quickly when the two are mixed together. It is this quick setting time that makes stucco ideal to work with in the mass production of wallboard.

Typically, wallboard consists essentially of a gypsum core sandwiched between two sheets of paper and is used as a cost-effective replacement of conventional plaster walls. To be commercially profitable, wallboard is typically manufactured by continuous high speed processes. Typically, gypsum (calcium sulfate dihydrate) predominately makes up the wallboard. Manufacturers mine (or receive synthetic gypsum) and transport gypsum to a board mill in order to dry it, grind it and calcine it to yield stucco (the "milling process"). Drying refers to the removal of the free water from the gypsum (water not bonded to calcium sulfate) and calcination refers to the conversion of calcium sulfate dihydrate to calcium sulfate hemihydrate. The general reaction for the creation of stucco is characterized by the following equation:

$$CaSO_4 \cdot 2H_2O + heat \rightarrow CaSO_4 \cdot \tfrac{1}{2}H_2O + 1\tfrac{1}{2}H_2O$$

This equation shows that calcium sulfate dihydrate plus heat yields calcium sulfate hemihydrate (stucco) plus water vapor. This process is normally conducted in a flash calcination impact mill, of which there are several types known in the art. One such example is an impact mill simultaneously dries, grinds, and calcines the gypsum to produce stucco.

More specifically, the flash calcination of raw gypsum results in several gypsum phases as described by the following reactions:

$$CaSO_4 \cdot 2H_2O + heat \rightarrow CaSO_4 \text{ (AIII)} + 2H_2O \text{ (Soluble Anhydrite)} \qquad I.$$

$$CaSO_4 \cdot 2H_2O + heat \rightarrow CaSO_4 \cdot \tfrac{1}{2}H_2O + 1\tfrac{1}{2}H_2O \text{ (Hemihydrate)} \qquad II.$$

$$CaSO_4 \cdot 2H_2O + heat \rightarrow CaSO_4 \text{ (AII)} + 2H_2O \text{ (Insoluble Anhydrite)} \qquad III.$$

As mentioned above, calcined gypsum (stucco) has the valuable property of being chemically reactive with water, and will "set" rather quickly when the two are mixed together. This setting reaction reverses the above-described stucco chemical reaction performed during the calcination step. The general reaction proceeds according to the following equation:

$$CaSO_4 \cdot \tfrac{1}{2}H_2O + 1\tfrac{1}{2}H_2O \rightarrow CaSO_4 \cdot 2H_2O + heat$$

In this reaction, the calcium sulfate hemihydrate is rehydrated to its dihydrate state over a fairly short period of time. The actual time required for this setting reaction generally depends upon the type of calciner employed, reagents added, and the type of gypsum rock that is used. More specifically, the gypsum hydration reaction proceeds according to the following conversion reactions:

$$CaSO_4 \text{ (AIII)} + 2H_2O \rightarrow CaSO_4 \cdot 2H_2O + heat \text{ (Soluble Anhydrite Conversion)} \qquad I.$$

$$CaSO_4 \cdot \tfrac{1}{2}H_2O + 1\tfrac{1}{2}H_2O \rightarrow CaSO_4 \cdot 2H_2O + heat \text{ (Hemihydrate Conversion)} \qquad II.$$

$$CaSO_4 \text{ (AII)} + 2H_2O \rightarrow CaSO_4 \cdot 2H_2O + heat \text{ (Insoluble Anhydrite Conversion)} \qquad III.$$

It is, in part, the aim of the present invention to pretreat the resultant gypsum phases created by flash calcination, particularly the highly reactive and water demanding soluble anhydrite (AIII) phase, prior to the stucco's introduction in the pin mixer that form the basis for this invention.

In manufacturing wallboard, a "stucco slurry" is formed by mixing together dry and wet ingredients in a pin mixer. The dry ingredients can include, but are not limited to, any combination of calcium sulfate hemihydrate (stucco), fiberglass, accelerator(s), and in some cases natural polymer (i.e., starch) The wet ingredients can be made up of many components, including but not limited to, a mixture of water, paper, pulp and potash. The stucco slurry is then discharged from the mixer through a tube which spreads the slurry on a moving, continuous bottom facing material (e.g., cover paper), which is slightly wider than the desired board width. A moving, continuous top facing material (e.g., cover paper) is placed on the slurry and the bottom facing material so that the slurry is positioned in between the top and bottom layers of the facing materials to form a "wet wallboard." Typically, forming plates are used to form the wallboard to the desired thickness and width. The board then travels along rollers for several minutes, during which time the setting reaction occurs and the board stiffens. The boards are then cut into a desired length and then fed into a large, continuous oven/kiln for drying. The end product is a wallboard with a gypsum core.

While conventional gypsum wallboard products have many advantages, it has also long been desired to reduce the cost of manufacturing gypsum wallboard. One method of reducing the cost of manufacturing gypsum wallboard has been to reduce the amount of water used in the manufacturing of the wallboard. Reduction in water reduces the amount of free water left in the wallboard after the setting reaction. A lower amount of free water left in the wallboard results in less drying energy being expended to remove the free water, which in turn saves energy costs associated with drying wallboard (i.e., the fuel cost associated with operating a kiln to dry the wallboard).

BRIEF DESCRIPTION OF THE DRAWINGS

The included drawings are for illustrative purposes and serve only to provide examples of possible structures for the disclosed invention. These drawings in no way limit any changes in form and detail that may be made to the invention by one skilled in the art without departing from the spirit and scope of the invention.

SUMMARY

As discussed herein, the present invention relates to systems and methods for producing a stucco slurry with a portion of the stucco being conditioned. Such systems and methods involve dividing a supply of stucco into two separate portions conditioning and aerating and/or wetting one portion of the stucco prior to supplying it to the mixer, and then adding the conditioned portion of the stucco along with the unconditioned portion of the stucco to the mixer with at least water to produce a stucco slurry that is used to manufacture gypsum wallboard.

In one embodiment, a portion of the stucco is conditioned by utilizing a blender to aerate and cool the first portion of the stucco. Such blenders can range in size and height, but an example of such a blender used can have a diameter that falls within the range of about 12 inches to about 24 inches. The blender can also be equipped with a mechanism to introduce cold air into the blender. An example of such a mechanism is equipping the bottom half of the blender with a water jacket and equipping the top half of the blender with vortex tubes and air nozzles. The supply of stucco to the blender and to the mixer can be controlled by feed control mechanisms that control the rate that a portion of the stucco to be conditioned is supplied to the blender and controls the rate of the remaining portion of the stucco is supplied to the mixer. In one example, the rate that the portion of stucco is supplied to the blender falls within the range of about 10 tons per hour to about 19 tons per hour, or, alternatively, up to 50% of the raw stucco feed.

To divide the stucco, multiple conveyors can be used in association with a gate that directs the portion of the stucco to be conditioned to the blender and directs the portion of the stucco that is unconditioned to a separate conveyor. In the use of the blender, the portion of the stucco to be conditioned travels from the stucco source (e.g., an impact mill) to the blender and the portion of the stucco that is not conditioned travels from the stucco source to the mixer. The two portions of the stucco can either be separately supplied to the mixer or the two portions of the stucco can be mixed back together prior to adding them to the mixer.

The stucco to be conditioned may also be pretreated with water. This may be carried out in the blender, or may be carried out in a conveyor treater prior to aerating in the blender. The conveyor treater, in one embodiment, has a conveyor belt, a plurality of nozzles for treating the top surface of a bed of stucco traveling on the belt, and a series of roller bars under the surface of the bed that agitate the stucco bed while its top surface is subject to low pressure water spray. The stucco pretreatment with water is intended to convert the soluble anhydrite (AIII) gypsum phase present within the multi-phase stucco mixture.

DETAILED DESCRIPTION OF THE INVENTION

Figure 1:
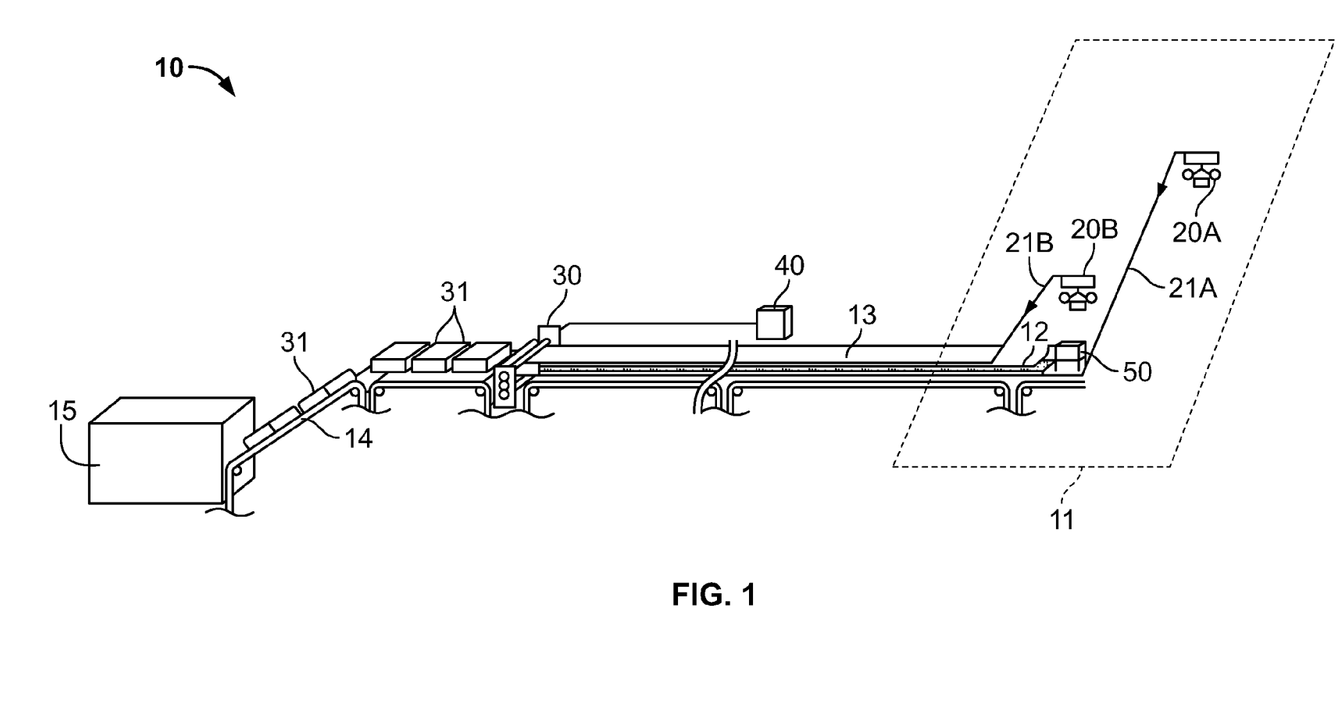
FIG. 1 illustrates an exemplary system for the commercial manufacture of wallboard.

FIG. 1 shows an exemplary wallboard manufacturing system 10 for the commercial manufacture of wallboard. As shown in FIG. 1, a bottom cover paper 21A is supplied by a bottom cover paper supply source 20A comprising two large spindles, each capable of supporting one huge roll of cover paper or like facing material used to manufacture wallboard. A top cover paper 21B is supplied by a separate top cover paper supply source 20B, which configuration is substantially similar to the configuration 20A for the bottom cover paper. While "cover paper" is used throughout this disclosure to discuss the facing materials used to create the wallboard, it is appreciated that any suitable facing material, including but not limited to fiberglass, can be used to create the wallboard.

As the bottom cover paper 21A leaves its point of origin, it travels along a conveyor, roller, belt or other like system 13 to a point where its edges are scored and upturned at substantially right angles with respect to the otherwise horizontally oriented bottom cover paper. Methods and devices for creating such upturned edges on cover paper on the fly are well known in the art, and any such methods and devices for performing this function may be utilized. A stucco slurry 12 is produced by adding the wet ingredients and dry ingredients to a mixer 50. While any suitable mixer can be used, a pin mixer is utilized in this embodiment to form the slurry 12.

Figure 2:
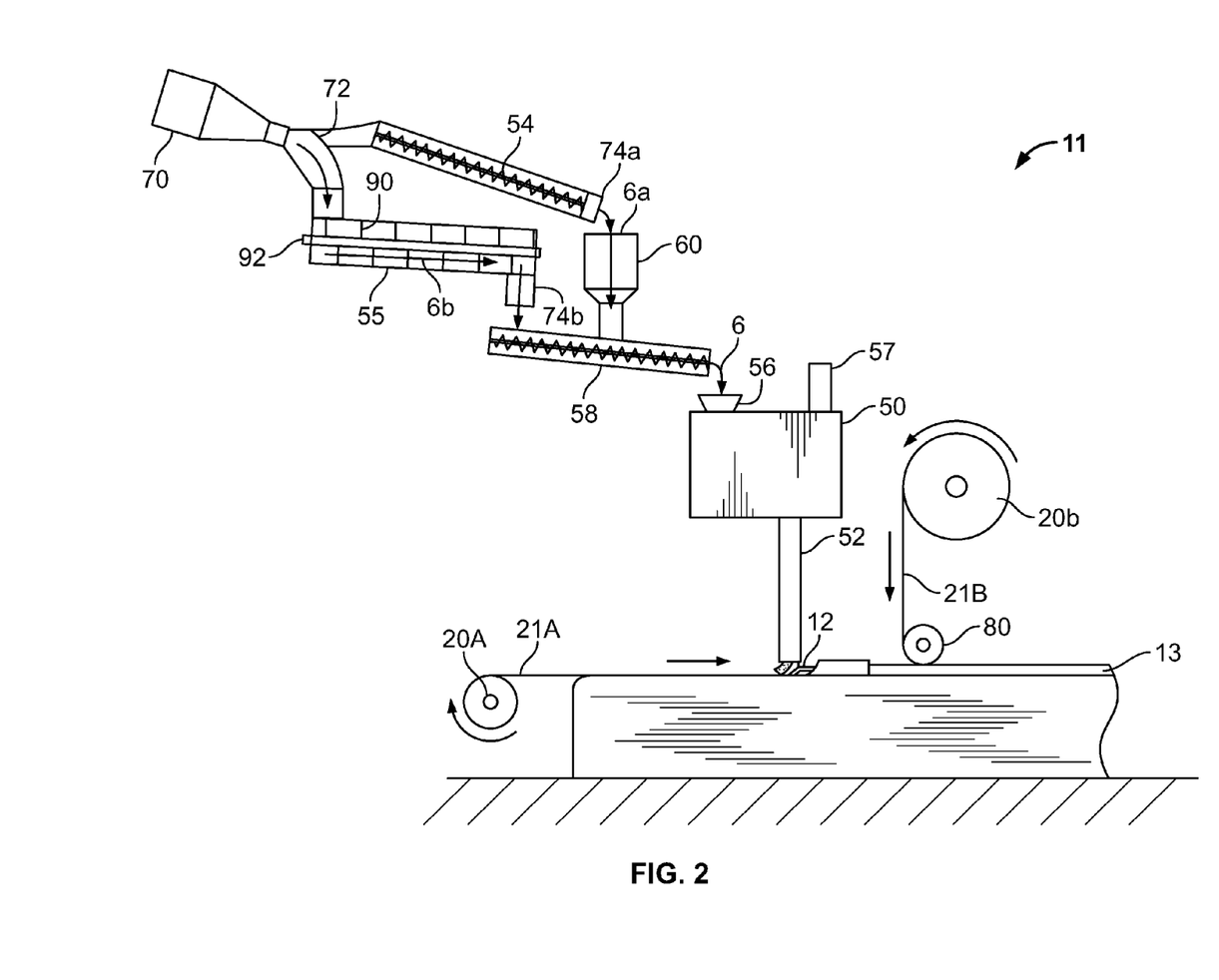
FIG. 2 illustrates a close up view of region 11 of FIG. 1.

FIG. 2 shows a close up view of region 11 of the gypsum wallboard manufacturing system 10 illustrated in FIG. 1. As shown in FIG. 2, a chute 52, commonly known as a boot, extends off of the mixer 50 and forms a pathway for the slurry 12 to exit out of the mixer 50 and onto the moving continuous sheet of bottom cover paper 21A. While the chute is shown in a vertical arrangement, it is appreciated by one skilled in the art that the chute can be a horizontal arrangement as well. The slurry 12 exits at a given location, which is preferably after the edges on the bottom cover paper have been upturned to form a shallow trough for receiving and containing the slurry. The slurry 12 quickly settles and evens out within the moving bottom cover paper 21A due to the liquid state of the slurry and the ongoing forward motion of the bottom cover paper.

Still referring to FIG. 2, the stucco 6 is supplied from a stucco source 70 (e.g., an impact mill) to either conveyor 54 or blender 55. A gate 72 can occupy a first position (see FIG. 2) that blocks stucco from being placed on conveyor 54, so that all the stucco leaving the impact mill 70 will enter blender 55. Gate 72 can move over to a second position that blocks stucco from being placed on blender 55, so that all stucco leaving the impact mill 70 will enter conveyor 54. Conveyor 54 leads to a hopper, funnel or similar device 60 which feeds stucco 6a to the main stucco conveyor 58. In this manner, gate 72 allows a portion of the stucco 6b to be diverted through a blender 55 before being added to the main stucco conveyor 58 and allows a portion of stucco 6a to be diverted to the main stucco conveyor 58 through funnel 60. It will be appreciated by one of ordinary skill in the art that while gate 72 is described as a slide gate that any type of diversion mechanism can be used to direct stucco to the blender 55 and conveyor 54, including but not limited, to a rotor gate.

Conveyor 54 leads to a measurement device 74a that measures the amount of stucco 6a that is provided to the main stucco conveyor 58. Moreover, a measurement device 74b can be used to measure that amount of stucco 6b that is provided to blender 55. The combination of stucco 6a and 6b comprises the desired amount of stucco to pin mixer 50 to create the stucco slurry.

Through the use of the device 74b, the blender is fed at a desired rate which is largely dependent upon the size of the blender. In one embodiment, the blender is fed at a rate of anywhere from about 10 tons per hour to about 19 tons per hour. It will be appreciated by one skilled in the art that any number of feed control mechanisms could be used as devices 74a and 74b, including without limitation a bin discharger, milltronics, a rotary-plow type discharger, or a weigh belt. Once device 74b transfers stucco 6b to blender 55, blender 55 is operated to aerate and cool the stucco 6b prior to stucco 6b being added to mixer 50. While it will be appreciated by one of ordinary skill in the art that any sized blender could be used to condition the stucco based off a manufacturer's needs, exemplary blenders used in system 10 can range in diameter from about 12 inches to about 24 inches and can average about eight feet in length. Blender 55 can be equipped with any number of paddles 90 that are rotated by a rotary shaft 92 to circulate and condition the stucco.

In this embodiment, once stucco 6a passes through conveyor 54, device 74a and funnel 60 and stucco stream 6b passes through device 74b and blender 55, both stucco 6a and 6b are added to the main stucco conveyor 58. Once combined back into stucco stream 6, the unconditioned stucco 6a and conditioned stucco 6b are added to mixer 50 by passing it through hopper 56. Water and other additives are added to mixer 50 through one or more inlets 57. While any suitable conveyors may be used to transport the stucco 6 to the mixer 50, conveyors 54 and 58 comprise a screw conveyor in this embodiment. Other suitable conveyors include a high angle type conveyor, a chain conveyor, or a recirculation conveyor. It will be appreciated by one skilled in the art that instead of combining stucco 6a and 6b in a main stucco conveyor, stucco 6a and 6b can instead be added directly to and combined in the mixer.

In other embodiments, blender 55 can be equipped with a water jacket on the bottom half of the blender and air nozzles and vortex tubes attached to the top half of the blender in order to introduce cold air to cool the blender while the stucco is being conditioned. For example, cold air can be added to the blender 55 by utilizing Vortec® cold air and vortex tubes manufactured by ITW Air Management. Vortex tubes create cold air and hot air by forcing high pressure compressed air through a generation chamber which spins the air centrifugally along the inner walls of the tube at approximately one million revolutions per minute towards the control valve. A percentage of the hot, high speed air is permitted to exit at the control valve. The remainder of the (now slower) air stream is forced to counter flow up through the center of the generation chamber finally exiting through the opposite end as extremely cold air. Such tubes are capable of generating temperatures down to 100° Fahrenheit below the inlet compressed air temperature using 100 pounds per square inch compressed air. After the vortex tubes create cold air, the cold air is introduced into the blender 55 by the air nozzles. It will be appreciated by one skilled in the art that any suitable sources of cold air can be used to introduce cold air into the blender 55 and that the use of a water jacket, vortex tubes, and air nozzles are only one example.

Referring to both FIGS. 1 and 2, the top cover paper 21B, at some distance after the slurry 12 has been deposited onto the bottom cover paper 21A, is directed into place atop the wet slurry and bottom cover paper, thereby forming a "sandwich" of slurry within sheets of cover paper. The top cover paper leaves its point of origin at source 20B and travels along a similar but separate conveyor, roller, belt or other like system 80 until it is directed into place atop the slurry and bottom cover paper. A "wet" wallboard is formed at this point, and several minutes are generally required until the wet wallboard has set sufficiently such that it can be cut and dried further. Because the manufacturing process would be considerably slowed by allowing this newly formed "wet" wallboard to sit in place while it sets for cutting, this newly formed wallboard is continually moved forward on conveyor 13 so that new wet wallboard can continue to be made while setting occurs. This conveyor 13 can be referred to as a "board line" and can extend for hundreds or thousands of feet before cutting.

A cutting mechanism such as a rotary knife 30 is located at the end of the board line and is used to cut the now set wallboard into smaller and more manageable sections 31. Although a rotary knife or blade type device is preferred, other cutting mechanisms, as would be readily understood by those skilled in the art, may also be used. This rotary knife 30 generally comprises a blade that extends across the width of passing wallboard and rotates in a direction compatible with the direction of the wallboard when activated to cut passing wallboard. The rotary knife 30 is also preferably controlled by or at least receives information from a control system 40 that is capable of measuring various parameters, assisting in the optimal placement of cover paper splices, and adjusting the timing of the knife cuts as necessary to isolate selected defects.

After this initial cutting of the wallboard by the rotary knife 30, the cut wallboard sections 31 are then placed onto a separate conveyor or roller system 14 by automated means so that they can be processed through heating kiln 15 or any other appropriate device for fully hardening and drying wallboard. Once these wallboard sections are sufficiently dried and hardened by the drying kilns or other drying device, they can then be further cut, bundled, packaged and processed in accordance with the desires of the manufacturer and the needs of consumers, through standard methods that are readily known to those skilled in the art. Such drying, bundling and packaging steps may be undertaken in any of a variety of ways.

By utilizing blender 55 to aerate and cool a portion of the stucco prior to it being added to the pin mixer, a manufacturer can decrease the amount of water needed in the hydration process by about 6 to about 8 percent, increase line speeds by about 10 to 15 feet per minute and reduce kiln drying temperatures. Each of these reductions produce a cost savings to manufacturers.

The following example is included to demonstrate some of the possible embodiments of the invention. Those of ordinary skill in the art should, in light of the present disclosure, appreciate that many changes can be made in the specific described example which is disclosed and still obtain a like or similar result without departing from the spirit and scope of the invention.

To determine the reduction of water that could be obtained by conditioning a portion of the stucco in this manner, one-half inch thick wallboards were produced utilizing the slurry formulation outlined below in Table I.

TABLE I

Typical Formulation by Mass Percent Based on Stucco

| Stucco | 100% |
| Accelerator | 0.08%-0.60% |
| Starch | .20%-.90% |
| Coalescing Additive | 0 |
| Potash | .02%-.15% |
| Pulp Paper | .09%-.15% |
| Pulp Water | 5.0%-12.6% |
| Gauging Water | 49%-68% |
| Dispersant | .19%-.75% |
| Retarder | .01%-.02% |
| Soap | 0.03%-.12% |
| Foam Water | 7.5%-18.7% |

In this embodiment, the blender was 12 inches in diameter and 8 feet in length and was obtained from Hayes & Solz Ind.

MFG. Co., Inc. The blender was equipped with four atomizing nozzles with cold air tubes, a water jacket, and was fed at a rate of 10 tons per hour. The blender operated at high-speed during the trial. The trial resulted in an average reduction of the water required to form the wallboard by approximately 6 to 8%.

Figure 3:
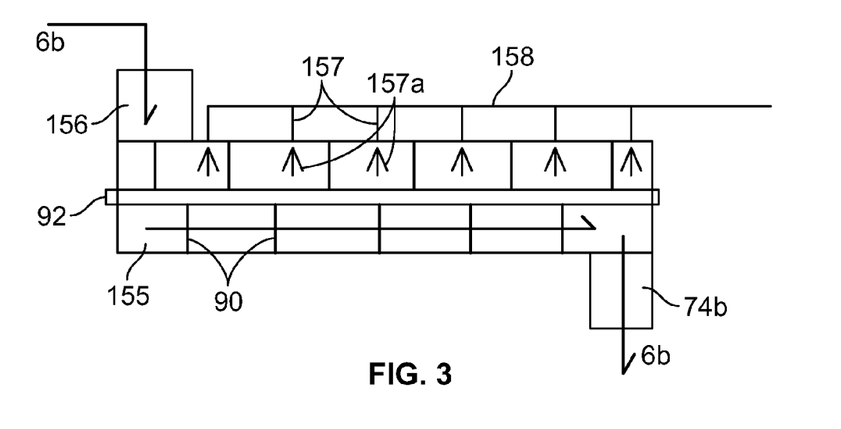
FIG. 3 illustrates an alternate embodiment using a water spray of region 11 of FIG. 1.

In further embodiments according to the invention, the stucco conditioning may include a water spray for pre-treating a portion of the gypsum prior to blending. This water pretreatment can substantially reduce the amount of water required to be added during the manufacture of gypsum slurry. In one embodiment, the blender 55 shown in FIG. 2 is replaced by the modified blender 155 shown in FIG. 3. As shown in FIG. 3, the stucco portion 6*b* for treating enters modified blender 155 through intake chute 156. The modified blender has a rotary shaft 92 and paddles 90, and device 74*b* for governing the amount of stucco 6*b* passing through modified blender 155. Modified blender also includes a plurality of water spray nozzles 157 that spray into the modified blender 155 from water manifold 158. In this fashion, the treated stucco 6*b* is also subject to a low-pressure water spray as it is being aerated and cooled in the modified blender 155.

Figure 4:
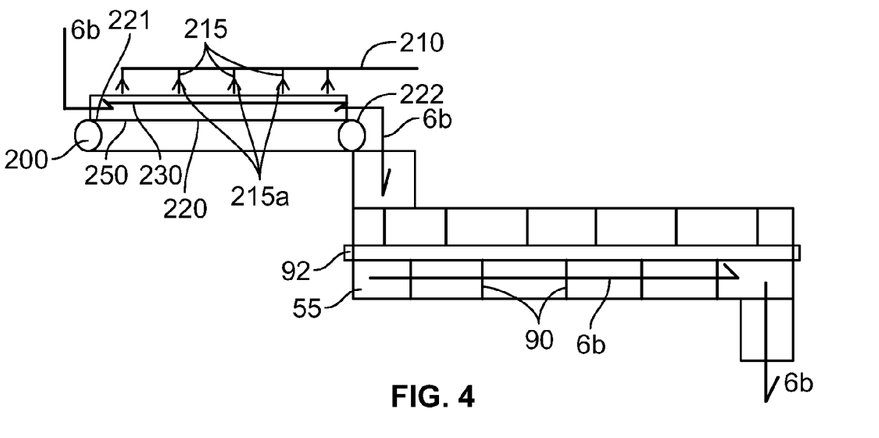
FIG. 4 illustrates an alternate embodiment using a water spray and conveyor treater of region 11 of FIG. 1.
Figure 5:
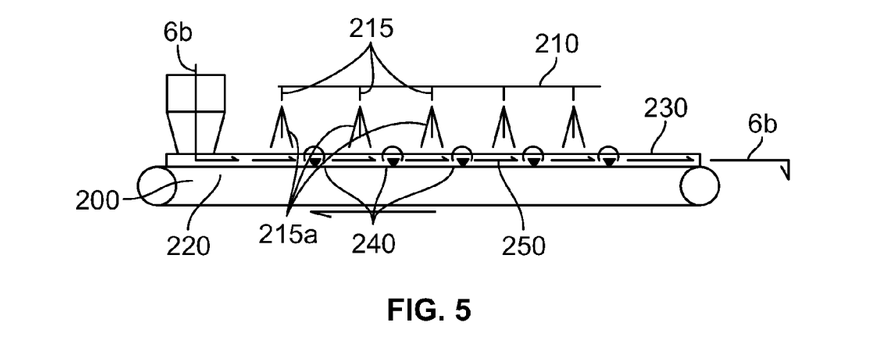
FIG. 5 is a side view of the conveyor treater shown in FIG. 4.
Figure 5A:
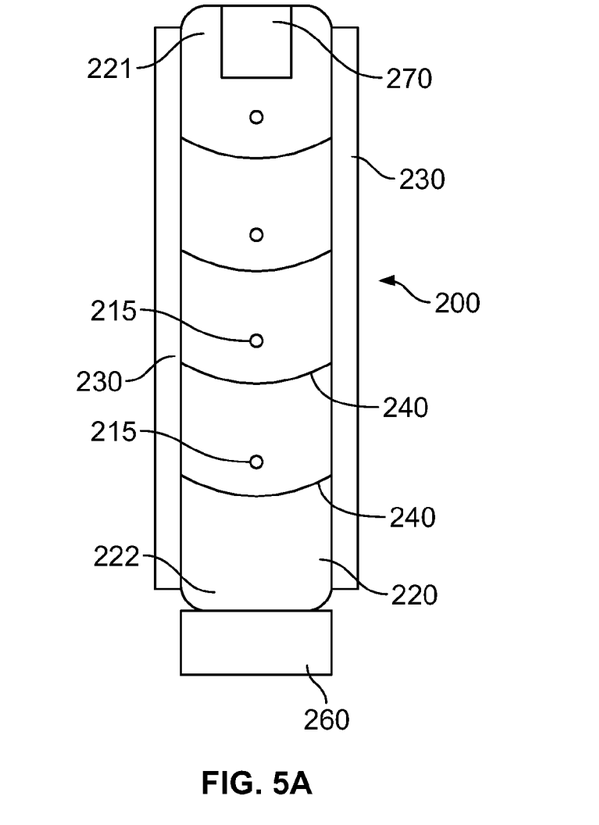
FIG. 5A is a top down view of the conveyor treater shown in FIG. 4.
Figure 5B:
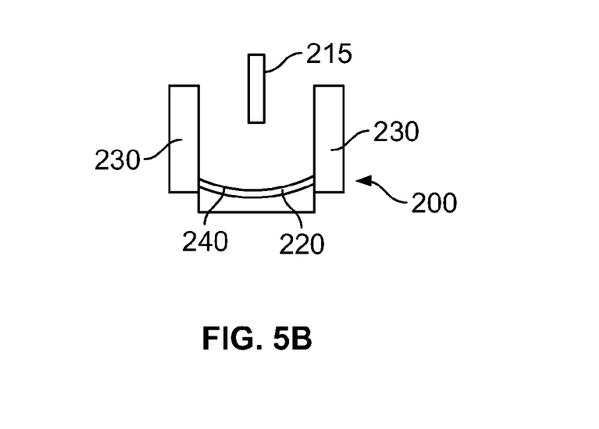
FIG. 5B is an end view of the conveyor treater shown in FIG. 4.
Figure 6:
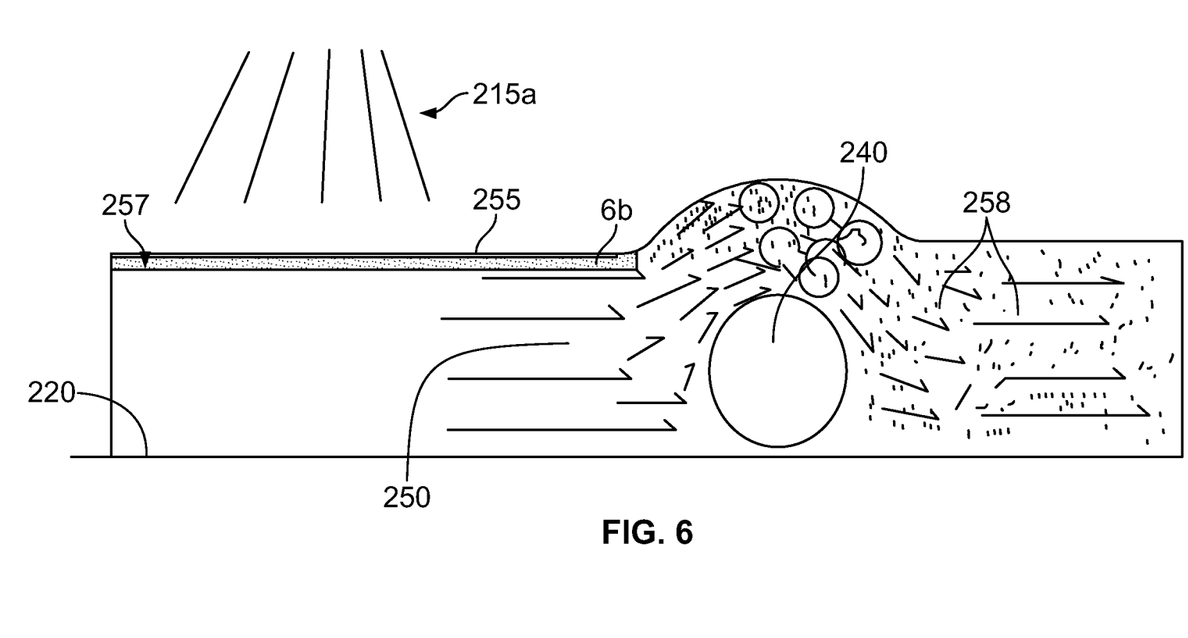
FIG. 6 is a close up view of a portion of the conveyor treater shown in FIG. 5.

Another embodiment of the invention, shown in FIGS. 4-6, incorporates a water pre-treatment of the slurry using the same blender 55 as shown in FIG. 2, with a conveyor treater 200 that applies water prior to aerating and cooling in the blender 55. This second embodiment has the advantage over the embodiment of FIG. 3 in that it does not expose moving parts of equipment to stucco and water, and thus avoids buildup of set gypsum on the equipment.

As shown schematically in FIG. 4, a portion of stucco 6*b* for treatment, which has been separated from untreated stucco 6*a* using gate 72 as described with respect to FIG. 2, is deposited at a first end 221 of conveyor belt 220 of conveyor treater 200, forming a bed of stucco 250 on the conveyor belt 220. As the bed of stucco 250 moves on the conveyor belt 220, the top of the bed 250 is subject to low pressure water sprays 215*a* delivered through nozzles 215 arranged along the length of conveyor belt 220. The conveyor belt 220 may have side rails 230 to maintain the bed 250 on conveyor belt 220. As the stucco 6*b* reaches second end 222 of conveyor belt 220, it is transferred to blender 55 to be cooled and aerated as described previously. The stucco 6*b* may be transferred to blender 55 through chute 260.

FIGS. 5, 5A, and 5B show the conveyor treater in closer detail. A stucco portion 6*b* is loaded onto first end 221 of conveyor belt 220 using a hopper 270. The hopper 270 may material from the source 70 through a rotary valve, and may have a slide gate to control the thickness of the bed 250 deposited onto belt 220. As shown in FIG. 5B, conveyor belt 220 may have a slight trough. Several nozzles 215 are disposed above the belt, which deposit a low pressure spray 215*a* onto the top surface 255 of stucco bed 250. The nozzles are designed so that the water spray 215*a* produced by each nozzle 215 overlaps each other slightly. However, the nozzles are designed so that the water spray avoids side rails 230, so as to avoid buildup along the side rails 230.

Several fixed roller bars 240 are disposed along belt 220. As shown in FIG. 5A, these roller bars 240 have a parabolic shape, with the vertex in the downstream direction. As seen in FIGS. 5 and 5A, the roller bars 240 are designed to be offset from the nozzles 215 to avoid the possibility of buildup on the roller bars 240. The roller bars are designed to provide turbulence to the bed 250. However, the roller bars 240 are to be kept under the surface of the moving stucco bed at all times, to avoid exposure to the water spray 218.

As can be seen in FIG. 6, the roller bar 240 on conveyor belt 220 causes agitation in the bed 250 of stucco 6*b* (indicated by arrows). The spray 215*a* is applied to the top surface 255 of bed 250, so that a layer 257 of treated stucco is formed. This layer 257 is dispersed by the action of roller 240, as indicated by dispersed particles 258; however, roller 240 is not subject to buildup due to the combination of stucco and water. Thus, the stucco is efficiently combined with a low pressure water spray 215*a* to provide a pretreatment that reduces the water demand during the production of gypsum slurry.

EXAMPLE

A pilot unit consisted of a 10 inch wide and six foot long conveyor belt to create a stucco bed. The conveyor was equipped with a variable speed drive. The belt was fitted with a trough attachment under the belt, and side rails along the edges of the bed. A rotary valve was built to receive stucco from the process and controllably deposit it into a hopper. The hopper was fitted with a movable slide gate to adjust the depth of the exiting material into the belt, and hence the bed depth. Low pressure sprayers were mounted above the conveyor belt of movable heights and spray patterns. The pressure of the spray was controlled using a water pressure regulator. Spray head pressure and rate were approximately 30 psig and 1.5 liters per minute. The stucco flow rate was 7.0 tons/hr. Analysis shows that the stucco treated in this manner has chemically combined water 1.28% higher than untreated stucco as a result of soluble anhydrite conversion. Additionally, the presence of over 2% adsorbed moisture was measured in the pretreated samples.

Several fixed turning bars were installed at intervals along the belt, which were parabolic with the vertex pointed downstream of the bed. The bars do not break the surface of the bed, and are designed to produce controlled turbulence, but not to grossly impede the bed's flow While the subject invention has been described in detail with reference to certain exemplary embodiments thereof, such are offered by way of non-limiting examples of the invention, as other versions are possible. For example, it will be appreciated by those skilled in the art that other means aside from utilizing a blender may be used to aerate and cool a portion of the slurry prior to adding it to a pin mixer. It will also be appreciated that the water pretreatment may also be carried out using a fluidized bed reactor. It is also appreciated by those skilled in the art that desirable stucco pretreatment may be achieved through the conveyor treater alone without a secondary aerating blender. It is anticipated that a variety of other modifications and changes will be apparent to those having ordinary skill in the art and that such modifications and changes are intended to be encompassed within the spirit and scope of the invention as defined by the following claims.

We claim:

1. A method for producing a stucco slurry, the method comprising the steps of:
    providing a mixer;
    providing a blender;
    providing a supply of flash calcined gypsum stucco;
    dividing the supply of flash calcined gypsum stucco into a first portion of stucco and a second portion of stucco;
    conditioning the first portion of stucco by aerating the first portion of the stucco in the blender;
    adding the conditioned first portion of stucco to the mixer;
    adding the second portion of stucco to the mixer, wherein the second portion of stucco is unconditioned; and mixing the conditioned first portion of stucco and the unconditioned second portion of stucco with at least water to produce the stucco slurry.

2. The method of claim 1, further comprising the step of combining the conditioned first portion of stucco together with the unconditioned second portion of stucco prior to adding the first and second portion of the stucco to the mixer.

3. The method of claim 1, wherein the step of conditioning the first portion of stucco includes treating the first portion of stucco with water.

4. The method of claim 3, wherein the step of conditioning the first portion of stucco comprises:
   forming the first portion of stucco as a moving bed of stucco;
   applying a water spray to the top surface of the moving bed of stucco; and
   agitating the moving bed of stucco, prior to circulating air through aerating the first portion of stucco.

5. The method of claim 4, wherein the step of forming the moving bed of stucco comprises placing the first portion of stucco on a conveyor belt.

6. The method of claim 5, wherein the conveyor belt has a longitudinal trough.

7. The method of claim 4, wherein applying a water spray is carried out through a plurality of nozzles above the moving bed.

8. The method of claim 5, wherein agitating the moving bed of stucco is carried out using roller bars along the conveyor belt.

9. The method of claim 8, wherein the roller bars are completely covered by the moving bed of stucco.

10. The method of claim 8, wherein the roller bars have a parabolic shape.

11. The method of claim 8, wherein applying a water spray is carried out through a plurality of nozzles above the moving bed of stucco and the roller bars are offset from the nozzles along the moving bed of stucco.

12. A method of producing a stucco slurry, the method comprising the steps of:
   providing at least one mixer;
   providing a first portion and a second portion of stucco;
   providing at least one blender;
   adding the first portion of stucco to the blender;
   conditioning the first portion of stucco by aerating the first portion of stucco in the blender;
   adding the conditioned first portion of stucco to the mixer;
   adding the second portion of stucco to the mixer, wherein the second portion of stucco is unconditioned;
   mixing the conditioned first portion of stucco, the unconditioned second portion of stucco, and at least water in the mixer to produce the stucco slurry.

13. The method of claim 12, wherein the blender has a diameter that is in the range of about 12 inches to about 24 inches.

14. The method of claim 12, further comprising the step of introducing cold air into the blender to cool the first portion of stucco during conditioning.

15. The method of claim 12, further comprising the steps of providing at least one feed control mechanism and using the at least one feed control mechanism to control the rate the first portion of stucco is supplied to the blender.

16. The method of claim 15, wherein the first portion of stucco is supplied to the blender at a rate of about 10 tons per hour to about 19 tons per hour.

17. The method of claim 15, wherein the at least one feed control mechanism comprises a first feed control mechanism that controls the rate the first portion of stucco is supplied to the blender and a second feed control mechanism that controls the rate the second portion of stucco is supplied to the mixer.

18. The method of claim 12, further comprising the step of combining the conditioned first portion of stucco together with the unconditioned second portion of stucco prior to adding the first and second portions of stucco to the mixer.

19. The method of claim 12, wherein the first portion and second portion of stucco are flash calcined gypsum stucco.

20. The method of claim 12, further comprising the steps of: providing a feed of stucco; and dividing the feed of stucco into the first portion and the second portion of stucco.

21. The method of claim 20, wherein the first portion of stucco is supplied to the blender at a rate that is up to 50% of the feed of stucco.

* * * * *

UNITED STATES PATENT AND TRADEMARK OFFICE
CERTIFICATE OF CORRECTION

PATENT NO. : 9,221,026 B2
APPLICATION NO. : 13/590074
DATED : December 29, 2015
INVENTOR(S) : Matthew M. Hilken et al.

Page 1 of 1

It is certified that error appears in the above-identified patent and that said Letters Patent is hereby corrected as shown below:

In the Claims:

At claim 4 (col. 9, line 17-18), delete "circulating air through".

Signed and Sealed this
Twenty-sixth Day of April, 2016

Michelle K. Lee
*Director of the United States Patent and Trademark Office*